United States Patent
Blouet et al.

(10) Patent No.: US 12,412,177 B2
(45) Date of Patent: *Sep. 9, 2025

(54) METHODS AND SYSTEMS FOR TRAINING A MACHINE LEARNING MODEL AND AUTHENTICATING A USER WITH THE MODEL

(71) Applicant: Daon Technology, Dublin (IE)

(72) Inventors: Raphael Blouet, Talence (FR); Ana Mantecon, Madrid (ES)

(73) Assignee: Daon Technology, Douglas (IM)

( * ) Notice: Subject to any disclaimer, the term of this patent is extended or adjusted under 35 U.S.C. 154(b) by 248 days.

This patent is subject to a terminal disclaimer.

(21) Appl. No.: 17/832,741

(22) Filed: Jun. 6, 2022

(65) Prior Publication Data

US 2023/0153815 A1 May 18, 2023

Related U.S. Application Data

(63) Continuation-in-part of application No. 17/529,344, filed on Nov. 18, 2021.

(51) Int. Cl.
*G06F 15/00* (2006.01)
*G06N 20/00* (2019.01)
(Continued)

(52) U.S. Cl.
CPC ....... *G06Q 20/40145* (2013.01); *G06N 20/00* (2019.01); *G06Q 20/4016* (2013.01); *G10L 17/00* (2013.01); *G10L 17/18* (2013.01)

(58) Field of Classification Search
CPC .......... G06N 20/00; G06N 20/10; G06N 3/02; G06N 3/08; G06N 3/09; G06N 3/091;
(Continued)

(56) References Cited

U.S. PATENT DOCUMENTS 5,995,927 A * 11/1999 Li .................... G10L 17/20
704/E15.01
11,735,158 B1 * 8/2023 Gupta .................. G10L 13/027
704/259

(Continued)

FOREIGN PATENT DOCUMENTS

WO    WO 2018/197916    11/2018

OTHER PUBLICATIONS

Sohn, Kihyuk. "Improved deep metric learning with multi-class n-pair loss objective." Advances in neural information processing systems 29 (2016). (Year: 2016).*
Li, Chao, et al. "Deep speaker: an end-to-end neural speaker embedding system." arXiv preprint arXiv:1705.02304 (2017). (Year: 2017).*

(Continued)

*Primary Examiner* — Michael Ortiz-Sanchez
(74) *Attorney, Agent, or Firm* — Kevin McDermott, Esq.

(57) ABSTRACT

A method of training a machine learning model (MLM) to conduct authentication transactions includes obtaining, by an electronic device, a training dataset of audio signals. Each audio signal includes voice biometric data of a user and an audio data production flag and belongs to a same or different data class. Moreover, the method includes creating, using a MLM being trained, at least one embedding for each audio signal and calculating, using the at least one embedding, a loss for a machine learning algorithm used for training the MLM. Furthermore, the method includes updating parameters of the MLM based on the calculated loss. In response to determining criteria defining an end of training have been satisfied, deeming the MLM to be operable for use in simultaneously successfully verifying the identity of a user based on voice biometric data and verifying the voice biometric data was spoken by a living person.

15 Claims, 6 Drawing Sheets

(51) Int. Cl.
  *G06Q 20/40* (2012.01)
  *G10L 17/00* (2013.01)
  *G10L 17/18* (2013.01)
(58) Field of Classification Search
  CPC ...... G06N 3/044; G06N 3/0464; G06F 21/32;
       G06F 21/31; G10L 25/30; G10L 17/04;
       G10L 15/063; G10L 17/26; G10L 17/24;
       G10L 17/00; G10L 17/18; G10L 17/16;
       G10L 17/06; G06Q 20/40145; G06Q
       20/40; G06Q 20/4016; G06Q 20/4014;
       H04L 9/32; H04L 9/3231
  See application file for complete search history.

(56) References Cited

U.S. PATENT DOCUMENTS

| | | |
|---|---|---|
| 2007/0129944 A1 | 6/2007 | Luan et al. |
| 2013/0166296 A1* | 6/2013 | Scheffer .................. G06F 21/32 704/243 |
| 2013/0179681 A1 | 7/2013 | Benson et al. |
| 2021/0304775 A1* | 9/2021 | van den Berg ......... G10L 25/51 |
| 2021/0326757 A1* | 10/2021 | Rawat .................... G06N 3/045 |
| 2023/0153408 A1* | 5/2023 | Blouet .................... G06N 3/04 726/19 |

OTHER PUBLICATIONS

Wan, Li, et al. "Generalized end-to-end loss for speaker verification." 2018 IEEE International Conference on Acoustics, Speech and Signal Processing (ICASSP). IEEE, 2018. (Year: 2018).*

Zhang, Chunlei, and Kazuhito Koishida. "End-to-End Text-Independent Speaker Verification with Triplet Loss on Short Utterances." (2017). (Year: 2017).*

Sigtia et al., "Multi-task Learning for Speaker Verification and Voice Trigger Detection", EE and Systems Science, Jan. 26, 2020, pp. 1-5.

Mun et al., "Robust text dependent speaker verification via character level information preservation for the SdSV challenge 2020", EE & Systems Science, Oct. 22, 2020, pp. 1-5.

Tang et al., "Multi-task recurrent model for speech and speaker recognition", Computer Science—Computation and Language, Sep. 27, 2016, pp. 1-5.

Chen et al., "Multi-task learning for text-dependent speaker verification", Interspeech 2015, Sep. 2015, pp. 185-189.

Examination Report for related EPO Application No. 22205416.5, dated Jan. 21, 2025, pp. 1-7.

Phan Tuan et al., "Multi-task Learning based Voice Verification with Triplett Loss", Int'l Conf. on MAPR, IEEE, Oct. 8, 2020, pp. 1-6.

Search Report for related EPO Application No. 22205416.5, dated Mar. 20, 2023, pp. 1-9.

* cited by examiner

METHODS AND SYSTEMS FOR TRAINING A MACHINE LEARNING MODEL AND AUTHENTICATING A USER WITH THE MODEL

CROSS-REFERENCE TO RELATED APPLICATIONS

This is a continuation-in-part application of U.S. patent application Ser. No. 17/529,344, filed Nov. 18, 2021, the disclosure of which is incorporated herein by reference.

BACKGROUND OF THE INVENTION

This invention relates generally to biometric authentication transactions, and more particularly, to methods and systems for training a machine learning model for simultaneously authenticating a user and determining liveness of the user.

Users are required to prove who they claim to be during authentication transactions conducted under many different circumstances. For example, users may be required to prove their identity when contacting a call center or a merchant while attempting to remotely purchase a product from a merchant system over the Internet. Claims of identity may be proven during authentication transactions based on audio data captured from the user.

During authentication transactions based on audio data it is known for users to speak or utter a phrase. The uttered phrase, or utterance, is a speech signal. User authentication based on audio data relies on the analysis of such speech signals. However, known authentication systems are unable to determine if such a speech signal was uttered by a living person.

Imposters have been known to impersonate users by providing a false claim of identity supported by fraudulent biometric data to deceive a service provider into concluding the imposter is the person he or she claims to be. Such impersonations are known as spoofing. During authentication transactions based on audio data impostors have been known to use many methods to obtain or create fraudulent biometric data of others that can be submitted during authentication transactions. For example, imposters have been known to obtain recordings of genuine users and to play one of those recordings during authentication to support a false claim of identity. This is known as a replay attack.

Imposters have also been known to use speech synthesis or/and voice cloning systems to generate a speech signal that mimics genuine user voice and to present the generated speech signal during an authentication transaction to support a false claim of identity. This is known as a speech-synthesis attack. Moreover, imposters have been known to use speech conversion systems to generate a speech signal that mimics genuine user voice and to present the generated speech signal during an authentication transaction to support a false claim of identity. This is known as a speech-conversion attack.

Such fraudulent audio data (i.e., speech signals) are difficult to detect using known liveness detection methods. Consequently, accurately conducting network-based biometric authentication transactions with data captured from a user at a remote location depends on verifying the physical presence of the user during the authentication transaction as well as accurately verifying the identity of the user with the captured biometric data. Verifying that the biometric data presented during a network-based biometric authentication transaction conducted at a remote location is from a live person at the remote location, is known as liveness detection or anti-spoofing.

Automatic Speaker Verification (ASV) is a known process of verifying the identity of a person based on a speech signal. Speaker Liveness Detection (SLD) is a known process for verifying that a speech signal was genuinely spoken by a live person and was not artificially generated. It is known that some authentication systems integrate an Automatic Speaker Verification (ASV) step and a Speaker Liveness Detection (SLD) step to authenticate a person and to verify a speech signal was genuinely spoken by the person.

State-of-the-art systems for ASV are known to train Deep Neural Network Models (DNN) to extract speaker-embeddings. Speaker-embeddings are vectors whose coefficients enable efficiently characterizing speakers. That is, the speaker embeddings are mathematical representations of the speaker that can be used to identify the speaker. Additionally, the embeddings can be used as an enrollment template.

For ASV, the state-of-the-art DNN training process is known to be optimized to extract speaker-embeddings that are independent of the recording conditions, independent of the linguistic content and the language of the speech signal and are a sparse representation of the user's voice. Recording conditions include, for example, the communication channel and background noise.

SLD systems are known to train two classes of DNN classification models able to distinguish between live (bona fide) and fraudulent utterances. Additionally, SLD systems are known to work directly on any signals and do not require any enrolment.

ASV and SLD components are trained separately. During training, the ASV model is calibrated to minimize speaker authentication error, and the SLD model is calibrated to minimize replay detection error. Training ASV and SLD models separately requires separately performing calculations for each which increases the time and costs associated with training.

Because SLD systems work directly on speech signals, it is difficult for SLD systems to detect all attacks. Moreover, speaker-embeddings are inappropriate for SLD systems.

Thus, it would be advantageous and an improvement over the relevant technology to provide a method, a computer, and a computer-readable recording medium capable of reducing training time and costs, conducting verification transactions that require fewer calculations, eliminating the use of two different models (one for ASV one for SLD), and enabling the extraction of speaker-liveness embeddings to authenticate a user and to detect whether a speech signal was generated by a live person.

BRIEF DESCRIPTION OF THE INVENTION

An aspect of the present disclosure provides a method of training a machine learning model to conduct authentication transactions that includes the step of obtaining, by an electronic device, a training dataset of audio signals. Each audio signal includes voice biometric data of a user and an audio data production flag and belongs to a same or different data class. Each data class includes a user identity and the audio data production flag or a different audio data production flag. Moreover, the method includes the steps of creating, using a machine learning model being trained, at least one embedding for each audio signal, calculating, using the at least one embedding, a loss for the machine learning algorithm (MLA) used for training the machine learning model, and updating parameters of the machine learning model being trained based on the calculated loss. In response to determining criteria defining an end of training have been satisfied, deeming the machine learning model to be operable for use in simultaneously successfully verifying the identity of a user based on voice biometric data and verifying the voice biometric data was spoken by a living person and was not artificially generated.

Another aspect of the present disclosure provides an electronic device for training a machine learning model to conduct authentication transactions. The electronic device includes a processor and a memory configured to store data. The electronic device is associated with a network and the memory is in communication with the processor and has instructions stored thereon which, when read and executed by the processor, cause the electronic device to obtain a training dataset of audio signals. Each audio signal includes voice biometric data of a user and an audio data production flag. Each data class includes a user identity and the audio data production flag or a different audio data production flag.

Moreover, the instructions when read and executed by the processor, cause the electronic device to create, using a machine learning model being trained, at least one embedding for each audio signal, calculate, using the at least one embedding, a loss for the machine learning algorithm (MLA) used for training the machine learning model, and update parameters of the machine learning model based on the calculated loss. In response to determining criteria defining an end of training have been satisfied, the machine learning model is deemed to be operable for use in simultaneously successfully verifying the identity of a user based on voice biometric data and verifying the voice biometric data was spoken by a living person and not artificially generated.

Yet another aspect of the present disclosure provides a non-transitory computer-readable recording medium in an electronic device for training a machine learning model to conduct authentication transactions.

Another aspect of the present disclosure provides a method for authenticating a user that includes prompting a user to speak a phrase, and capturing, by an electronic device, audio data of the user while the user speaks the phrase. The method also includes the steps of creating a verification template from the captured audio data, comparing the verification template against a corresponding enrollment template of the user, calculating a matching score for the comparison, and comparing the matching score against a threshold score. In response to determining the matching score is at least equal to the threshold score, the method includes the step of simultaneously successfully verifying the identity of the user based on the captured audio data and verifying the captured audio data was spoken by a living person.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
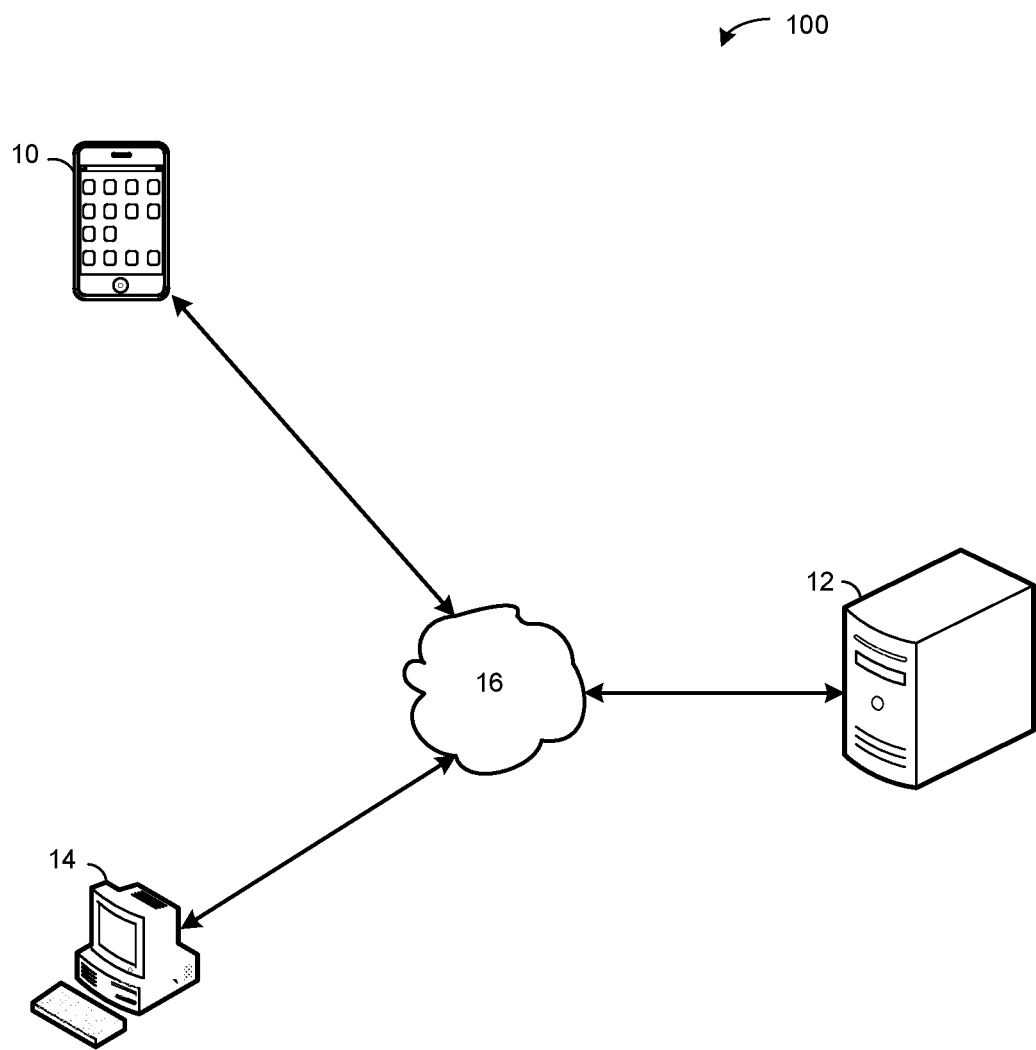
FIG. 1 is a schematic diagram of an example computing system for training a machine learning model and authenticating a user with the model according to an embodiment of the present disclosure.

FIG. 1 is a schematic diagram of an example computing system 100 for training a machine learning model and authenticating a user with the model according to an embodiment of the present disclosure. As shown in FIG. 1, the main elements of the system 100 include a computing device 10, a server 12, and a computer 14 communicatively connected via a network 16.

In FIG. 1, the computing device 10 can be any wireless hand-held consumer computing device capable of at least downloading applications over the Internet, running applications, capturing and storing data temporarily and/or permanently, and otherwise performing any and all functions described herein by any computer, computer system, server or computing device included in the system 100. One example of the computing device 10 is a smart phone. Other examples include, but are not limited to, a cellular phone, a tablet computer, a phablet computer, a laptop computer, and any type of hand-held consumer computing device having wired or wireless networking capabilities capable of performing the functions, methods, and/or algorithms described herein.

The computing device 10 is typically associated with a single person who operates the device. The person who is associated with and operates the computing device 10, as well as speaks during enrollment and/or during an authentication transaction is referred to herein as a user.

The server 12 can be, for example, any type of server or computer implemented as a network server or network computer.

One example of the computer 14 is a personal computer (PC). Other examples include, but are not limited to, a cellular phone, a tablet computer, a phablet computer, a laptop computer, and any type of hand-held consumer computing device having wired or wireless networking capabilities capable of performing the functions, methods, and/or algorithms described herein. The computing device 10, server 12, and computer 14 are electronic devices so each may be alternatively referred to as an electronic device.

Additionally, the computing device 10, the server 12, and the computer 14 may each alternatively be referred to as an information system.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of computing devices 10, servers 12, and computers 14 is not limited to the number of computing devices 10, servers 12, and computers 14 shown in the system 100. Rather, any number of computing devices 10, servers 12, and computers 14 may be included in the system 100.

Figure 2:
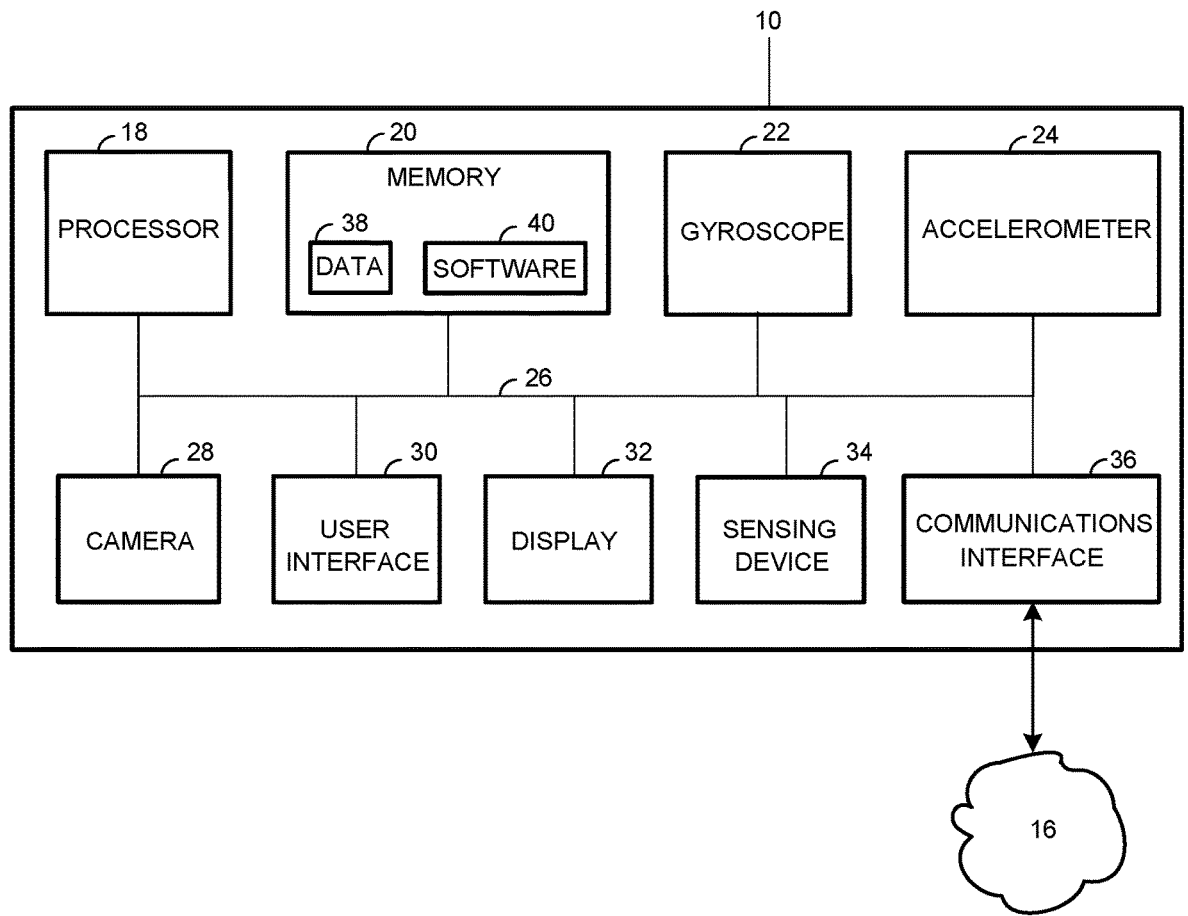
FIG. 2 is a more detailed schematic diagram illustrating a computing device in the system of FIG. 1.

FIG. 2 is a more detailed schematic diagram illustrating the computing device 10. The computing device 10 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the computing device 10 is provided via the bus 26.

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMS, any type of physical and/or virtual storage, or any other digital source such as a network or the Internet from which computer programs, applications or executable instructions can be read.

The memory 20 may be used to store any type of data 38, for example, data records of users. Each data record is typically for a respective user. The data record for each user may include data such as, but not limited to, the user's name, an identifier of the computing device 10 associated with the user, passphrase identifiers, biometric modality data, biometric templates, features matrices, embeddings, and personal data. A biometric template can be any type of mathematical representation of biometric modality data and can be associated with a class of data. For example, a template can be any mathematical function of one or more embeddings. Biometric modality data is the data of a biometric modality of a person. For the methods and systems described herein, the biometric modality is voice.

Voice biometric data may be captured by the computing device 10 by recording a user speaking a phrase. Captured voice biometric data may be temporarily or permanently stored in the computing device 10 or in any device capable of communicating with the computing device 10 via the network 16. Voice biometric data is captured as audio data. Audio signals are audio data. As used herein, capture means to record temporarily or permanently, any data including, for example, biometric modality data of a person.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 20 can be used to store any type of software 40. As used herein, the term "software" is intended to encompass an executable computer program that exists permanently or temporarily on any non-transitory computer-readable recordable medium that causes the computing device 10 to perform at least a portion of the functions, methods, and/or algorithms described herein. Application programs are software and include, but are not limited to, operating systems, Internet browser applications, authentication applications, feature extraction computer programs, machine learning algorithms (MLA), machine learning models, and any other software and/or any type of instructions associated with algorithms, processes, or operations for controlling the general functions and operations of the computing device 10. The software may also include computer programs that implement buffers and use RAM to store temporary data.

Authentication applications enable the computing device 10 to conduct user verification and identification (1:C) transactions with any type of authentication data, where "C" is a number of candidates. Feature extraction computer programs process audio signals to generate a representative feature vector that contains information about the signal. Machine learning models have parameters which are modified during training to optimize functionality of the models trained using a machine learning algorithm (MLA). MLAs include at least classifiers and regressors. Example classifiers are Time Delay Neural Networks, Recurrent Neural Network and Residual Networks.

The process of verifying the identity of a user is known as a verification transaction. For verification transactions based on voice biometric data users typically speak two phrases. One phrase is an identity verification phrase and the other is a liveness detection phrase.

During a verification transaction based on voice biometric data, a verification template is generated from a spoken identification verification phrase captured during the transaction. The verification template is compared against a corresponding recorded enrolment template of the user and a score is calculated for the comparison. The recorded enrolment template is created during enrolment of the user in an authentication system. If the calculated score is at least equal to a threshold score, the identity of the user is verified as true. Alternatively, the captured voice biometric data may be compared against the corresponding record voice biometric data to verify the identity of the user.

During verification transactions, the spoken identification verification phrase may be evaluated to verify it was spoken by a live person. For example, it is known to use an utterance and verify it was spoken by the user and contains a required phrase. This facilitates detecting replay attacks but not voice cloning and/or voice conversion attacks. This is not convenient for users because users are required to speak a second phrase which is used to evaluate liveness of the user. It is also known to use a liveness detection computer system which requires processing captured biometric data by two systems but does not use user specific information in the liveness detection process.

The user interface 30 and the display 32 allow interaction between a user and the computing device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a keyboard, a mouse, an illuminator, a signal emitter, a microphone, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the computing device 10 to enter data, change settings, control functions, etc. Consequently, when the touch screen is touched, the user interface 30 communicates this change to the processor 18, and settings can be changed or user entered information can be captured and stored in the memory 20. The display 32 may function as an illumination source to apply illumination to an object while image data for the object is captured.

The sensing device 34 may include Radio Frequency Identification (RFID) components or systems for receiving information from other devices in the system 100 and for transmitting information to other devices in the system 100. The sensing device 34 may alternatively, or additionally, include components with Bluetooth, Near Field Communication (NFC), infrared, or other similar capabilities. Communications between the computing device 10 of the user, the server 12, and the computer 14 may occur via NFC, RFID, Bluetooth or the like only so a network connection from the computing device 10 is unnecessary.

The communications interface 36 may include various network cards, and circuitry implemented in software and/or hardware to enable wired and/or wireless communications with other computing devices 10 (not shown), the server 12, and the computer 14 via the network 16. Communications include, for example, conducting cellular telephone calls and accessing the Internet over the network 16. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet™ or an Asynchronous Transfer Model (ATM) network) to provide a data communication connection to a compatible LAN. As yet another example, the communications interface 36 may be a wire or a cable connecting the computing device 10 with a LAN, or with accessories such as, but not limited to, other computing devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across the network 16. The exchange of information may involve the transmission of radio frequency (RF) signals through an antenna (not shown). Moreover, the exchange of information may be between the computing device 10, the server 12, the computer 14, other computing devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The computing devices (not shown) may be associated with any user or with any type of entity including, but not limited to, commercial and non-commercial entities.

The server 12 and the computer 14 may include the same or similar components as described herein with regard to the computing device 10. The server 12 and computer 14 need not include all the same components described herein with regard to the computing device 10. For example, the server 12 and the computer 14 may not include the gyroscope 22 and/or the accelerometer 24.

Figure 3:
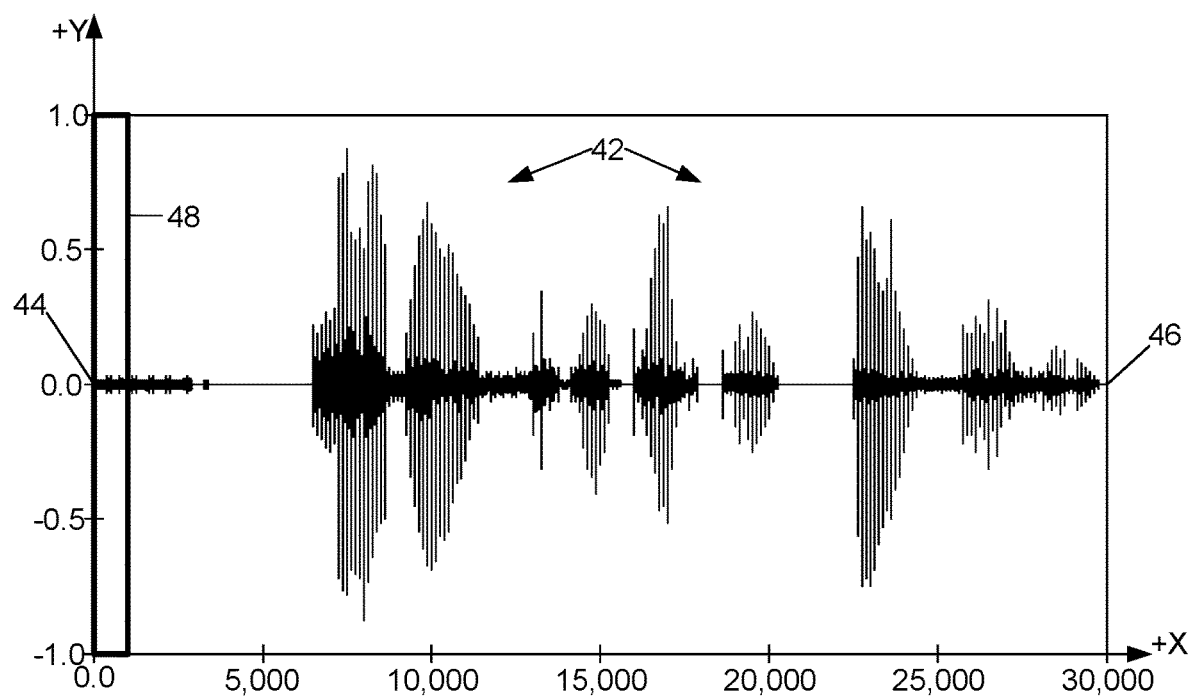
FIG. 3 is a diagram illustrating an example audio signal including a temporal window.

FIG. 3 is a diagram illustrating an example audio signal 42 captured by the computing device 10 while a user spoke a phrase. The audio signal 42 may be captured by the computing device 10 while it is operated by the user or another person. The audio signal 42 may be captured as a continuous analog signal and converted into an audio signal by sampling at any frequency within the range of 8 kHz and 96 kHz. The audio signal 42 may be provided in Pulse Code Modulation (PCM) in 8, 16, or 24 bits or in compressed format, for example, in flac, mp3, a-law, mu-law and amr, and may be filtered using a pre-emphasis filter that amplifies the high-frequency content of the data. The audio signal 42 is audio data that represents voice biometric data of the user and an audio production flag.

The audio signal 42 is plotted on a Cartesian coordinate system having X and Y-axes. The X-axis represents the number of discrete elements included in the captured audio signal 42 in which each discrete element is captured at a rate, in seconds, equal to the inverse of a sampling frequency. The Y-axis represents the normalized values of the discrete elements of the signal 42. Alternatively, the Y-axis may represent the actual values of the discrete elements in the signal 42. The audio signal 42 extends from the origin 44 to a terminus 46 and has a duration of about three (3) seconds. The duration of the audio signal 42 depends on the length of the spoken phrase which may also vary.

A temporal window 48 is located in an initial position flush with the origin 44 and has a duration of twenty-five (25) milliseconds. Alternatively, the temporal window 48 may be any duration that facilitates creating matrices from which embeddings can be extracted and used to generate accurate and trustworthy authentication results as described herein. The window 48 is translated in the positive direction along the X-axis over the duration of the signal 42 in ten (10) millisecond increments. Consequently, the temporal window 48 occupies many different positions over the signal 42. The 10-millisecond increment is the frame rate which may be any value that facilitates calculating signal features as described herein.

The window 48 can be implemented as a mathematical function that multiples the audio signal 42 by a window function. That is, a window function that is zero-valued outside of a chosen temporal interval and symmetric around the middle of the interval. The non-zero temporal interval of the window function is translated by the frame rate over the duration of the audio signal 42. The window function can be a Hamming window function. However, any window function may alternatively be used that facilitates calculating signal features as described herein.

In each different position, the window 48 includes a different portion of the signal 42, which portion is processed, for example, by a feature extraction computer program to calculate signal features including, but not limited to, melspectrum Fourier coefficients. Alternatively, any other type of coefficients representative of the audio signal can be used.

The feature extraction computer program uses a Fast Fourier Transform to calculate the coefficients. For each different window position, eighty (80) melspectrum Fourier coefficients are calculated. Alternatively, any number of coefficients may be calculated that facilitates creating a matrix from which embeddings may be extracted.

The calculated melspectrum Fourier coefficients constitute the dimensions of a single acoustic vector at a position of the window over the signal 42. The audio signal 42 is three seconds in duration, so the window 48 occupies three hundred (300) different positions. As a result, three hundred (300) acoustic vectors are created. The number of created acoustic vectors depends on the duration of the audio signal 42. Thus, for any captured audio signal 42, the number of created acoustic vectors may be more or less than three hundred (300). An m×n matrix may be created from the acoustic vectors, where "m" indicates the number of acoustic vectors and "n" indicates the dimension of each acoustic vector. For the example audio signal 42, the m×n matrix includes an acoustic vector for each window position, yielding a matrix having dimensions of m=300 and n=80. Additionally, the matrices may alternatively be the raw audio signal with or without any previous modifications.

Generally, a phrase spoken by a user can be referred to as an utterance. Example phrases include but are not limited to, "My voice is my password, verify me" and "I have several busy children, verify me." Alternatively, a phrase may be a single letter or number, a group of letters or numbers, any combination of letters and numbers, or one or more sentences. Any phrase may be spoken to generate the audio signal 42.

Meta data associated with the audio signal 42 includes, but is not limited to, the identity of the user who spoke the phrase to generate the signal 42 and an audio data production flag. An audio data production flag may be any information that represents the source that generated voice biometric data. Sources include, but are not limited to, a live person or a mechanism or device capable of recording and emitting sounds. When the source of voice biometric data is a live person the voice biometric data is considered genuine. Replays or other artificial reproductions of spoken phrases generated by mechanisms or device are considered fraudulent. Replays and artificial reproductions are typically associated with spoofing attacks. Thus, when the source of voice biometric data is a mechanism or device the voice biometric data is considered fraudulent.

An audio data production flag may be a number or any representation that allows identifying the source and thus determining whether or not voice biometric data is genuine or fraudulent. For example, an audio data production flag may be the number zero (0) for genuine voice biometric data and the number one (1) for fraudulent voice biometric data.

Each user identity and corresponding audio data production flag constitutes a different class of data which may be denoted as, for example, (user identity, audio data production flag). For example, Joe Smith and the audio data production flag of number one (1) may constitute one class of data, while Joe Smith and an audio data production flag of zero (0) may constitute another class of data. These classes of data may be denoted (Joe Smith, 1) and (Joe Smith, 0), respectively.

Audio signals generated by speaking a phrase are assigned to the corresponding class of data. For example, the audio signal generated by Alvina McDermott speaking the phrase "My voice is my password, verify me" and having an audio data production flag of zero (0) is assigned to the class (Alvina McDermott, 0).

Although the class of data is described herein as including the user identity and an audio data production flag, it is contemplated by the present disclosure that the class of data may alternatively include any set of items of data that may be used to train a machine learning model capable of verifying whether or not two audio signals belong to the same class of data. The set may include any pair of items of data. The items of data include, but are not limited to, user identity, passphrase identifiers, audio data production flags, and biometric modality data. As a result of determining two audio signals belong to the same class, the trained machine learning model enables simultaneously successfully verifying the identity of a user based on voice biometric data and verifying the voice biometric data was spoken by a live person and is thus genuine.

The total number of users and audio data production flags may be designated as "$C_{inv}$", and each user may have a set of spoken phrases designated as $utt_s^{p,k}$ where "s" is the index for the user identity, "p" is the index for the audio data production flag, and "k" is the index for the occurrence of the audio biometric data associated to user "s" with production flag "p". Thus, for example, a spoken phrase designated as $utt_s^{p,3}$ indicates the third sample of voice biometric data corresponding to the audio data production flag "p" for user identity "s".

Each m×n matrix may be designated "x." A subscript including the indexes "s" and "p" may be used to designate the class of the audio data while a superscript including the index "k" may be used to designate the index of the occurrence. Thus, for example, the notations $x_{s_1,p_1}^1$ and $x_{s_1,p_1}^2$ represent matrices associated with the first and second occurrences of voice biometric data, respectively, of user $s_1$ with the audio data production flag $p_1$. As a result, the matrices $x_{s_1,p_1}^1$ and $x_{s_1,p_1}^2$ are assigned to the same class of audio data. As another example, the notations $x_{s_2,p_1}^1$ and $x_{s_2,p_2}^1$ represent matrices corresponding to the first occurrences of voice biometric data associated to user $s_2$ with the audio data production flag $p_1$ and audio biometric data associated to user $s_2$ with the audio data production flag $p_2$. Thus, the class of the matrix $x_{s_2,p_1}^1$ is different than the class of the matrix $x_{s_2,p_2}^1$. As a result, the matrices $x_{s_2,p_1}^1$ and $x_{s_2,p_2}^1$ are assigned to different classes of audio data. It is contemplated by the present disclosure that different notations and/or designations may be used to indicate whether or not matrices belong to the same or different class.

The audio signal 42 includes voice biometric data of a user and an audio data production flag. Audio signals generated by different people speaking the same or different phrase include different voice biometric data and an audio data production flag and belong to different classes. As a result, audio signals generated by different people speaking the same or different phrase are different. Because the audio signals contain biometric data about a user and an audio data production flag, matrices created from such signals are a function of voice biometric data and audio data production flags.

A machine learning model for conducting authentication transactions may be trained using a machine learning algorithm (MLA). Such machine learning models include, but are not limited to, automatic speaker verification (ASV) models and speaker liveness detection (SLD) models. Some authentication systems integrate an ASV step and a SLD step to authenticate a user and to validate that a speech signal was genuinely spoken by a user. Training to generate the ASV and SLD models occurs separately.

MLAs typically require the definition of an objective function when being used to train a machine learning model for performing a desired function. The objective function is referred to herein as a "loss function." Loss functions define an objective against which the performance of the machine learning model is measured during training. Parameters learned by the machine learning model during training are determined by minimizing the loss function. Most common losses are known as categorical losses, for example, the cross-entropy loss.

During training of an ASV model, the class of data of each audio signal is the identity of the person who spoke the phrase to generate the signal. A class of data including user identities is input into the MLA. Using the loss function, the MLA calculates a loss associated with the user identities and the loss is used to modify parameters of the ASV model being trained. Parameters include, but are not limited to, weight and bias. After modifying the parameters, the user identities are again input into the MLA which again calculates a unique loss associated with the user identities which is used to again modify the parameters of the model. This process is repeated until a minimum loss is calculated which indicates that the ASV model has been adequately trained to be operable to conduct authentication transactions based on user identities.

SLD systems are known to train two classes of DNN classification models able to distinguish between live (bona fide) and fraudulent utterances. Additionally, SLD systems are known to work directly on any signals and do not require any enrolment.

ASV and SLD components are trained separately. During training, the ASV model is calibrated to minimize speaker authentication error, and the SLD model is calibrated to minimize replay detection error. Training ASV and SLD models separately requires separately performing calculations for each which increases the time and costs associated with training.

Because SLD systems work directly on speech signals, it is difficult for SLD systems to detect any kind of attacks. Moreover, speaker-embeddings are inappropriate for SLD systems.

To address these problems a machine learning model may be trained using a training dataset of audio signals. Each of the audio signals includes voice biometric data of a user and an audio data production flag and belongs to a same or different data class. Each data class, or class of data, includes a user identity and an audio data production flag. A feature matrix can be created for each audio signal. The matrices are input into a machine learning model being trained using a machine learning algorithm (MLA). The model can calculate one or more embeddings for each matrix. Embeddings are known to be a fixed-dimensional representation of variable-length audio signals. When the machine learning model is defined as a deep neural network (DNN) model, embeddings are usually generated from one of the hidden layers of the DNN. Audio signals that belong to the same class of data are typically close to each other in the embedding space.

Embeddings as described herein may include, for example, replay-detection specific information and should be capable of including information about the identity of a speaker while allowing classification of an audio signal as being spoken by a live person or being artificially replayed. An audio signal deemed to have been spoken by a live person is considered genuine, while an audio signal deemed to have been replayed is considered fraudulent and the result of an attack. Embeddings enable conducting an authentication transaction based on audio data using one model only.

The embeddings may be used by a loss function to calculate a loss for the MLA and the calculated loss may be used by the MLA to update parameters of the machine learning model being trained. In response to determining criteria defining the end of training have been satisfied, the trained machine learning model is deemed operable to enable simultaneously successfully verifying the identity of the user based on voice biometric data and verifying the voice biometric data was spoken by a live person.

Embeddings are a mathematical representation of a matrix so may be expressed as f(x). More specifically, the embeddings computed from the feature matrix $x_{s_1,p_1}^1$ may be expressed, for example, as $f(x_{s_1,p_1}^1)$. Because matrices are a function of the voice biometric data of a user and an audio data production flag, content extracted from the matrices, for example, embeddings are also a function of the voice biometric data of a user and the audio data production flag. The matrices and embeddings extracted therefrom may be stored in the computing device 10.

It is contemplated by the present disclosure that a machine learning model for conducting authentication transactions may be trained using a MLA and audio signals from classes of data defined by the user identity and an audio data production flag. Metric losses enable building systems directly optimized for accepting or rejecting a candidate voice biometric data given a reference voice biometric data. Metric losses such as, but not limited to, a triplet loss, a prototypical loss, and a contrastive loss particularly suit the problem of estimating parameters of a model able to successfully verify speaker identity and that voice biometric data was spoken by a live person.

Triplet loss is a loss function for MLAs where a baseline input is compared to a positive input and a negative input. A positive input is from the same class as the baseline input and the negative input is from a different class than the baseline input. The triplet loss facilitates updating parameters of the machine learning mod& being trained in order to minimize the distance from the baseline input to the positive input, and to maximize the distance from the baseline input to the negative input.

For each iteration of the training process, triplet losses can be calculated during training using the following equations:

$$L_s = \frac{1}{n_s(n_s-1)} \sum_{i \in N_s} \sum_{j \in N_s \setminus i} \max(\|f(x_s^i) - f(x_s^j)\|_2^2 - \|f(x_s^i) - f(x_r^k)\|_2^2 + \alpha_{trp}, 0)$$

and $$L_{trp} = \frac{1}{n}\sum_{s} L_s$$

Where:

$L_{trp}$ is the triplet loss;

$L_s$ is the loss calculated separately for each class s;

Matrices $x_s^i$ and $x_s^j$ belong to the same class, class s, which means the user and audio data production flag are the same. Additionally, matrices $x_s^i$ and $x_s^j$ are different occurrences of the same class of audio signals, being occurrence i and j, respectively, of the audio data class s.

Matrix $x_r^k$ belongs to a different class, class r, at an occurrence k. "r" is considered a negative input class because it is different than "s". The negative input class and occurrences, r and k, respectively, may be randomly selected. Alternatively, any other method may be used, for example, a method for selecting a negative input class r may include selecting the class with the highest authentication score against class s and using current parameters of the machine learning model during training.

Functions $f(x_s^i)$, $f(x_s^j)$, $f(x_r^k)$ are the embeddings extracted from the input matrices $x_s^i$, $x_s^j$ and $x_r^k$, respectively, while passing the window 48 over the signal 42 for respective users and audio data production flags.

N is an ensemble of different classes of data in the training database;

n is the number of elements in ensemble N;

$N_s$ is the number of occurrences of an audio signal for class s;

$n_s$ is the number of elements in ensemble s;

$N_s \setminus i$ is the ensemble of occurrences of audio signals for class s except for occurrence i; and $\alpha_{trp}$ is a margin of error.

Known systems do not use a pair of items of data including, for example, a user identity and an audio data production flag. Rather, known systems use classes of data that each include a single item of training data, for example, user identity only.

Training a machine learning model using the above equations for calculating triplet losses $L_{trp}$ facilitates creating a model operable for simultaneously successfully verifying the identity of a user based on voice biometric data and verifying that the voice biometric data was spoken by a live person.

Each user identity and corresponding audio data production flag constitutes a different class of data which may be denoted as, for example, (user identity, audio data production flag). For example, Joe Smith and the audio data production flag of number one (1) may constitute one class of data, while Joe Smith and an audio data production flag of zero (0) may constitute another class of data. These classes of data may be denoted (Joe Smith, 1) and (Joe Smith, 0), respectively.

Audio signals generated by speaking a phrase are assigned to the corresponding class of data. For example, the audio signal generated by Alvina McDermott speaking the phrase "My voice is my password, verify me" and having an audio data production flag of zero (0) is assigned to the class (Alvina McDermott, 0).

Although the class of data is described herein as including the user identity and an audio data production flag, it is contemplated by the present disclosure that the class of data may alternatively include any set of items of data that may be used to train a machine learning model capable of verifying whether or not two audio signals belong to the same class of data. The set may include any pair of items of data. The items of data include, but are not limited to, user identity, passphrase identifiers, audio data production flags, and biometric modality data. As a result of determining two audio signals belong to the same class, the trained machine learning model enables simultaneously successfully verifying the identity of a user based on voice biometric data and verifying the voice biometric data was spoken by a live person and is thus genuine.

Figure 4:
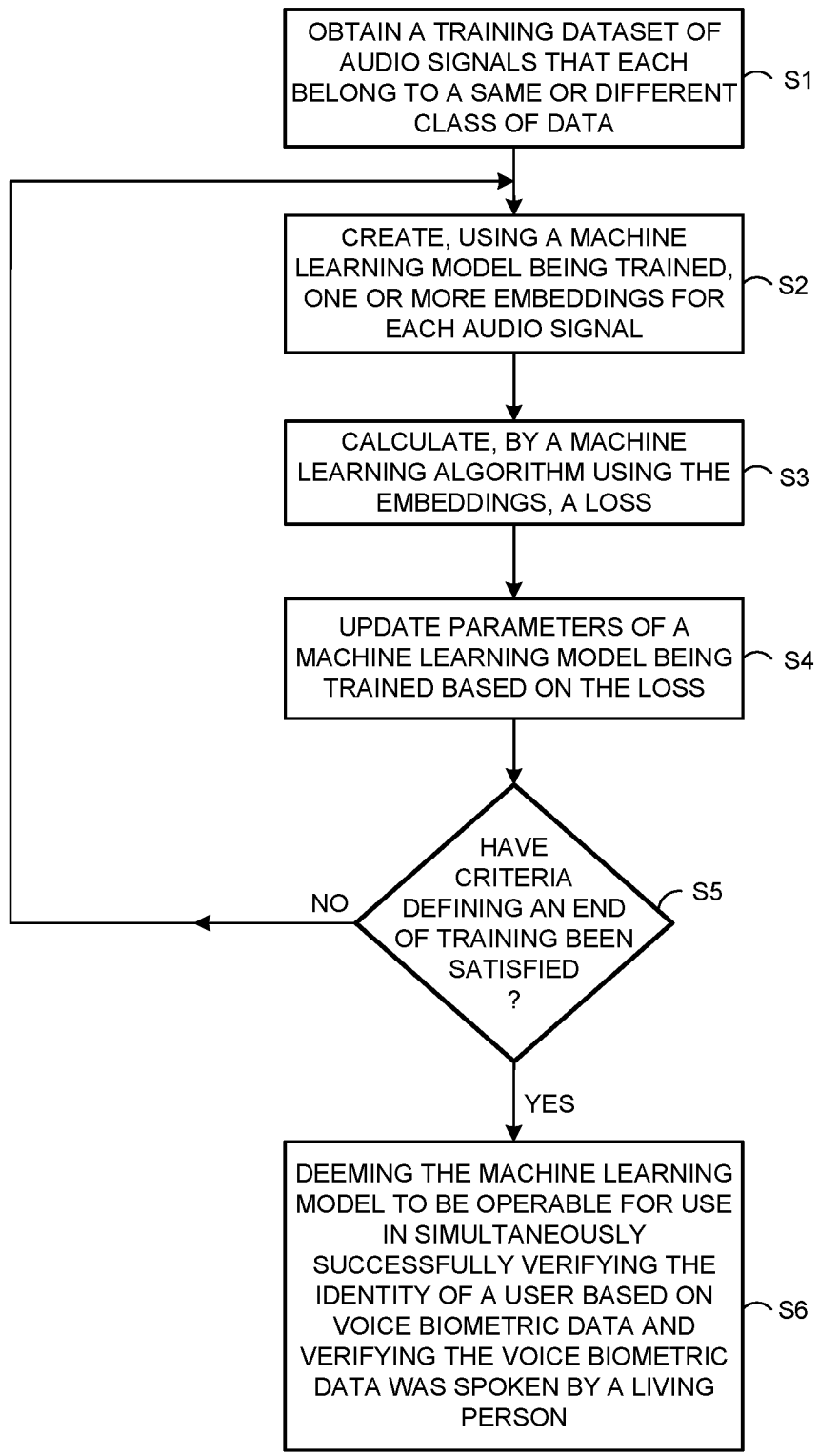
FIG. 4 is a flowchart illustrating an example method and algorithm for training a machine learning model for use in conducting authentication transactions according to an embodiment of the present disclosure.

FIG. 4 is a flowchart illustrating an example method and algorithm for training a machine learning model for use in conducting authentication transactions based on voice biometric data. FIG. 4 illustrates example operations performed when the computing device 10 runs software 40 stored in the memory 20 to train a machine learning model for use in conducting authentication transactions. A user may cause the computing device 10 to run the software 40 or the computing device 10 may automatically run the software 40.

In step S1, the software 40 executed by the processor 18 causes the computing device 10 to obtain a training dataset of audio signals that each belong to a same or different class of data. Each audio signal includes voice biometric data of a user and an audio data production flag. Each class of data includes the identity of a user and an audio data production flag.

Next, in step S2, the software 40 executed by the processor 18 causes the computing device 10 to create one or more embeddings for each audio signal in each class of data. More specifically, the computing device 10 can create a feature matrix $x_s^i$, $x_s^j$ or $x_r^k$ for each audio signal in each class of data and input the matrices $x_s^i$, $x_s^j$ and $x_r^k$ into the machine learning model that is being trained using a machine learning algorithm (MLA). The model and MLA are both software that can be executed by the processor 18. The feature matrices $x_s^i$, $x_s^j$ or $x_r^k$ may be created, for example, by translating a window implemented as a mathematical function over each audio signal. During translation, the window may occupy many different positions on the respective signal. Fourier coefficients may be calculated in each position and these coefficients may be used to create a matrix $x_s^i$, $x_s^j$ or $x_r^k$ for the respective signal. Alternatively, any other type of coefficients representative of the audio signal may be used. Additionally, the matrices may alternatively be the raw audio signal with or without any previous modifications. The machine learning model being trained is executed by the processor 18 and causes the computing device 10 to calculate one or more embeddings for each of the matrices $x_s^i$, $x_s^j$ or $x_r^k$ to thus create the embeddings. An embedding is a mathematical representation of a matrix which may be expressed as f(x). The embeddings of the matrices $x_s^i$, $x_s^j$ and $x_r^k$ may be expressed as $f(x_s^i)$, $f(x_s^j)$ and $f(x_r^k)$, respectively.

In step S3, the MLA software executed by the processor 18 causes the computing device 10 to calculate a loss, $L_s$, for each class of data and a triplet loss, $L_{trp}$ for the MLA, according to the following equations:

$$L_s = \frac{1}{n_s(n_s-1)} \sum_{i \in N_s} \sum_{j \in N_s \setminus i} \max(\|f(x_s^i) - f(x_s^j)\|_2^2 - \|f(x_s^i) - f(x_r^k)\|_2^2 + \alpha_{trp}, 0)$$

and $$L_{trp} = \frac{1}{n}\sum_{s} L_s$$

Where:

$L_{trp}$ is the triplet loss;

$L_s$ is the loss calculated separately for each class s;

Matrices $x_s^i$ and $x_s^j$ belong to the same class, class s, which means the user and the audio data production flag for the matrices are the same. Additionally, matrices $x_s^i$ and $x_s^j$ are different occurrences of the same class of audio signals, being occurrence i and j, respectively, of the audio data class s.

Matrix $x_r^k$ belongs to a different class, class r, at an occurrence k. "r" is considered a negative input class because it is different, than "s".

Functions $f(x_s^i)$, $f(x_s^j)$, $f(x_r^k)$ are the embeddings extracted from the input matrices $x_s^i$, $x_s^j$ and $x_r^k$, respectively, while passing the window 48 over the signal 42 for respective users and audio data production flag.

N is an ensemble of different classes of data in the training database;

n is the number of elements in ensemble N;

$N_s$ is the number of occurrences of an audio signal for class s;

$n_s$ is the number of elements in ensemble s;

$N_s \backslash i$ is the ensemble of occurrences of audio signals for class s except for occurrence i; and $\alpha_{trp}$ is a margin of error.

In step S4, the MLA software 40 executed by the processor 18 causes the computing device 10 to update parameters of the machine learning model being trained based on the calculated loss $L_{trp}$. Example parameters include, but are not limited to, weight and bias. Next in step S5, the software 40 executed by the processor 18 causes the computing device 10 to determine whether or not criteria defining an end of training have been satisfied. Such criteria include, but are not limited to, convergence of calculated losses and a number of times the matrices have been input into the machine learning model being trained. The loss may be considered to converge when a number of consecutive calculated losses does not decrease, for example, two consecutive losses, or the decrease is less than a threshold. Alternatively, any number of consecutive losses may be used. The matrices may be entered into the machine learning model being trained any number of times, for example, 100 times. This facilitates training a machine learning model capable of simultaneously successfully verifying the identity of a user based on voice biometric data and verifying the voice biometric data was spoken by a live person.

When the criteria defining the end of training have been satisfied, in step S6, training is complete and the machine learning model can be deemed operable to enable simultaneously successfully verifying the identity of a user based on voice biometric data and verifying the voice biometric data was spoken by a live person. Otherwise, a new iteration occurs and, in step S2, the software 40 executed by the processor 18 causes the computing device 10 to create an embedding for each audio signal.

It is contemplated by the present disclosure that steps S2, S3, S4, and S5 may be repeatedly conducted until the criteria defining the end of training are satisfied in step S5.

Using the described method and algorithm for training a machine learning model facilitates creating a machine learning model that enables simultaneously successfully verifying the identity of a user based on voice biometric data and verifying that the voice biometric data was spoken by a live person. As a result, the machine learning model facilitates quickly generating accurate and trustworthy authentication transaction results from captured voice biometric data and facilitates reducing costs for generating such results.

Figure 5:
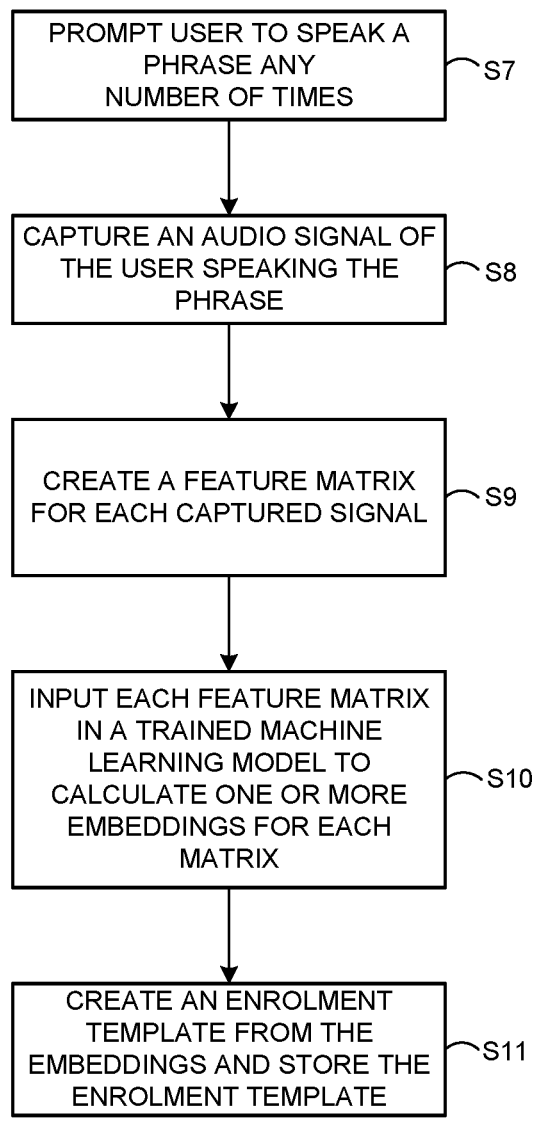
FIG. 5 is a flowchart illustrating an example method and algorithm for enrolling a user in an authentication system implemented by the computing device according to an embodiment of the present disclosure.

FIG. 5 is a flowchart illustrating an example method and algorithm for enrolling a user in an authentication system implemented by the computing device 10. FIG. 5 illustrates example operations performed when the computing device 10 runs software 40 stored in the memory 20 to enroll a user. A user may cause the computing device 10 to run the software 40 or the computing device 10 may automatically run the software 40.

In step S7, the software 40 executed by the processor 18 causes the computing device 10 to prompt a user to speak a phrase. For example, the computing device 10 may ask the user to choose a phrase or display a phrase and a message to speak the phrase a number of times. The message may be any type of instruction that prompts the user to speak a phrase any number of times, for example, three. An example phrase may be "I'm going skiing, verify me" and an example message may instruct the user to speak the phrase three times.

In step S8, the software 40 executed by the processor 18 causes the computing device 10 to capture voice biometric data of the user speaking the phrase. The voice biometric data is captured as audio data in the form of an audio signal, for example, audio signal 42. Thus, when the phrase is to be captured three times, three different audio signals are captured.

In step S9, the software 40 executed by the processor 18 causes the computing device 10 to create a feature matrix for each captured audio signal and, in step S10, to input the matrices into a machine learning model trained to conduct authentication transactions, for example, as described herein regarding the flowchart illustrated in FIG. 4. The trained machine learning model software is executed by the processor 18 to cause the computing device 10 to calculate one or more embeddings for each matrix. Next, in step S11, the software 40 executed by the processor 18 causes the computing device 10 to create an enrolment template from the embeddings and store the template in the memory 20. The enrolment template can be any set of the embeddings or any function of the set of embeddings such as, but not limited to, the mean embedding vector or the reduced embedding vector. Thus, for example, when the phrase is spoken three times, three matrices are created, embeddings are calculated for the matrices, and an enrollment template is created from the embeddings.

Figure 6:
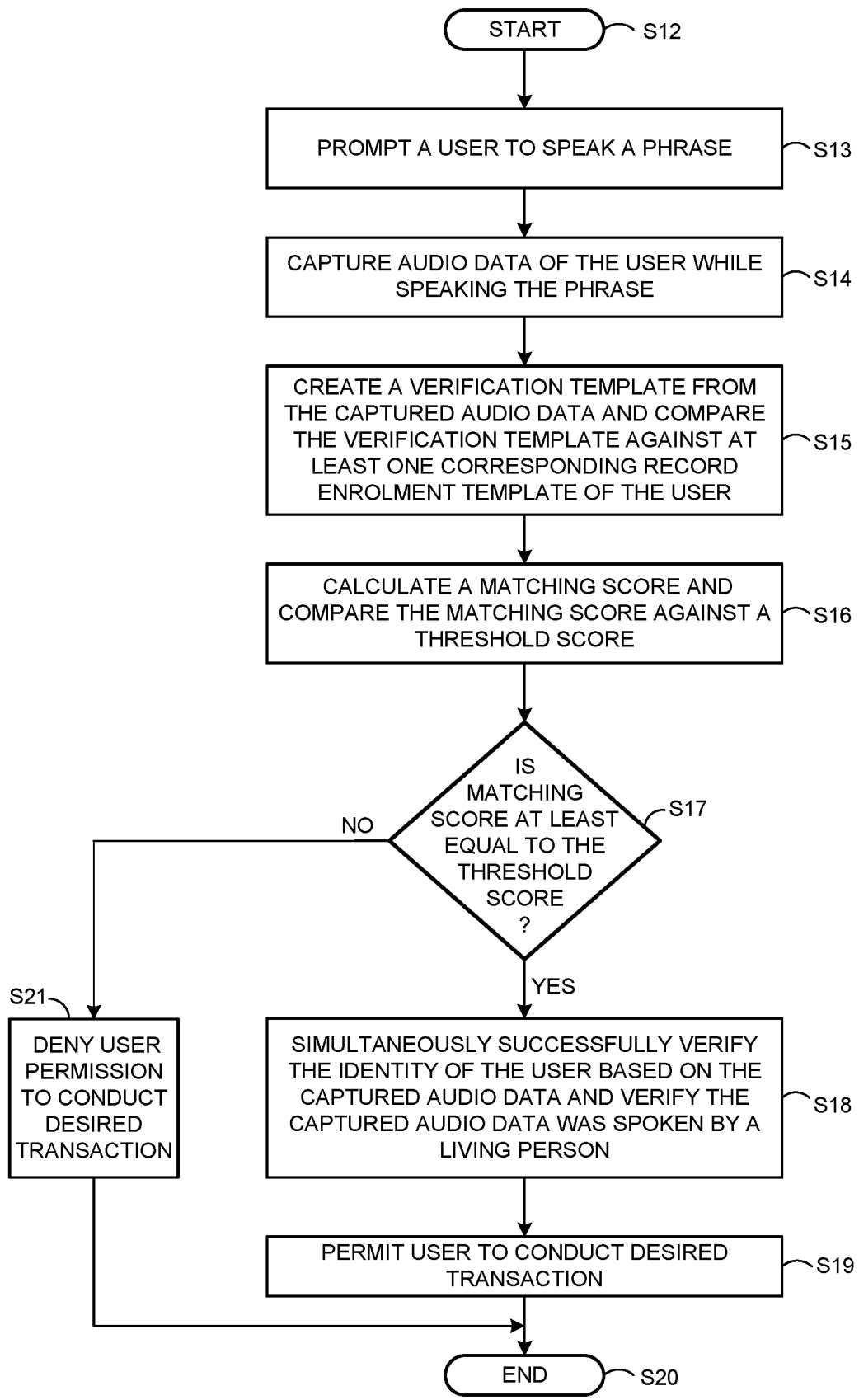
FIG. 6 is a flowchart illustrating an example method and algorithm for authenticating a user according to an embodiment of the present disclosure.

FIG. 6 is a flowchart illustrating an example method and algorithm for authenticating a user. When a user desires to conduct an activity, the user may be required to prove his or her identity before being permitted to conduct the activity. Examples of activities include, but are not limited to, accessing an area within a commercial, residential or governmental building, or conducting a network-based transaction. Example network-based transactions include, but are not limited to, buying merchandise from a merchant service provider website and accessing top secret information from a computer system. FIG. 6 illustrates example operations performed by the computing device 10 during authentication transactions.

The method and algorithm start in step S12, then in step S13 the software 40 executed by the processor 18 causes the computing device 10 to prompt a user to speak a phrase by displaying a message instructing the user to speak the phrase. Alternatively, the phrase and the message may both be displayed. In step S14, the computing device 10 captures audio data of the user while speaking the phrase. The audio data is captured in the form of an audio signal, for example, audio signal 42.

In step S15, the software 40 executed by the processor 18 causes the computing device 10 to create a verification template from the captured audio data. More specifically, the computing device 10 creates a matrix from the captured audio data, extracts content from the matrix to create one or more embeddings, and creates a verification template from the embeddings. The verification template is compared against the corresponding enrolment template of the user and a matching score is calculated for the comparison. However, it should be understood that if both the verification and enrolment templates include several embeddings, each enrolment and verification embeddings combination is used to generate a matching score. A final matching score can be calculated as the average over all these scores or can be calculated using any other mathematical function allowing to combine them.

Next, in step S16, the software 40 executed by the processor 18 causes the computing device 10 to calculate a matching score and to compare the matching score against a threshold score. In step S17, the software 40 executed by the processor 18 causes the computing device 10 to determine whether or not the matching score is at least equal to the threshold score. In response to determining the matching score is at least equal to the threshold score, in step S18, the software 40 executed by the processor 18 causes the computing device 10 to simultaneously successfully verify the identity of the user based on the captured audio data and verify that the captured audio data was spoken by a live person.

It should be understood that when the matching score is at least equal to the threshold score the computing device 10 determines that the captured audio signal belongs to the same class of data as the audio signal or signals captured during enrollment. By virtue of determining the captured and enrollment audio signal belong to the same class, the computing device 10 simultaneously successfully verifies the identity of the user based the captured audio data and verifies the captured audio data was spoken by a live person.

Next, in step S19, the user is permitted to conduct the desired transaction and in step S20, the method and algorithm end. However, when the matching score is less than the threshold score, in step S21, the user is denied permission to conduct the desired transaction. In step S20, the method and algorithm end.

Using the method and algorithm for conducting authentication transactions based on audio data enables simultaneously successfully verifying the identity of a user based on audio data and verifying the audio data was spoken by a live person. As a result, the method and algorithm for conducting authentication transactions facilitates reducing the time and costs of generating accurate and trustworthy authentication transaction results based on voice biometric data.

The example methods and algorithms described herein may be conducted entirely by the computing device 10, partly by the computing device 10 and partly by the server 12 via the network 16, or partly by the computing device 10 and the computer 14 via the network 16. Additionally, the methods and algorithms described herein may be conducted partly by the computing device 10, partly by the server 12 and partly by the computer 14 via the network 16. For example, the computer 14 may use a machine learning algorithm (MLA) to train a machine learning model for use in conducting authentication transactions, while the server 12 may conduct authentication transactions using the trained model, or vice versa. Moreover, the example methods described herein may be conducted entirely on other computer systems (not shown) other computing devices 10 (not shown). Thus, it should be understood that it is contemplated by the present disclosure that the example methods and algorithms described herein may be conducted using any combination of computers, computer systems, and computing devices (not shown). Furthermore, data described herein as being stored in the computing device 10 may alternatively, or additionally, be stored in the server 12, the computer 14, or in any computer system (not shown) or computing device (not shown) operable to communicate with the computing device 10 over the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that, for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method of training a machine learning model to conduct authentication transactions comprising the steps of:
    obtaining, by an electronic device, a training dataset of audio signals, wherein each audio signal includes voice biometric data of a user and an audio data production flag and belongs to a same or different data class, each data class comprises a user identity and the audio data production flag or a different audio data production flag;
    creating a feature matrix for each audio signal according to the class of data to which the respective audio signal belongs;
    inputting the matrices into the machine learning model being trained;
    calculating at least one embedding for each of the matrices;
    calculating, using the at least one embedding, a loss for a machine learning algorithm (MLA) used for training the machine learning model;
    updating parameters of the machine learning model being trained based on the calculated loss;
    in response to determining criteria defining an end of training have been satisfied, deeming the machine learning model to be operable for use in simultaneously successfully verifying the identity of a user based on voice biometric data and verifying the voice biometric data was spoken by a living person;
    and in response to determining criteria defining an end of training have not been satisfied, repeatedly conducting said creating a feature matrix for each audio signal step, inputting step, calculating at least one embedding for each of the matrices step, calculating, using the at least one embedding, a the loss step, creating, calculating and updating steps until the criteria are satisfied.

19

2. The method according to claim 1, wherein the electronic device is a sole electronic device.

3. The method according to claim 1, said calculating a loss step comprising the step of calculating a metric loss, wherein the metric loss is a triplet loss, a prototypical loss, or a contrastive loss.

4. The method according to claim 1, said calculating a loss step comprising calculating the loss according to the equations $$L_s = \frac{1}{n_s(n_s-1)} \sum_{i \in N_s} \sum_{j \in N_s \setminus i} \max(\|f(x_s^i) - f(x_s^j)\|_2^2 - \|f(x_s^i) - f(x_r^k)\|_2^2 + \alpha_{trp}, 0)$$

and $$L_{trp} = \frac{1}{n} \sum_s L_s$$

Where: $L_{tr_p}$ is the triplet loss; Ls is the loss calculated separately for each class s; Matrices $x_s^i$ and $x_s^j$ belong to the same class, class s, which means the user and the audio data production flag for the matrices are the same;

Matrix $x_r^k$ belongs to a different class, class r, at an occurrence k;

Functions $f(x_s^i), f(x_s^j), f(x_s^k)$ are embeddings extracted from the input matrices $x_s^i$, $x_s^j$ and $x_r^k$, respectively;

N is an ensemble of different classes of data in the training dataset;

n is the number of elements in ensemble N;Ns is the ensemble of occurrences of audio signals for class s; $\alpha_{erns}$ is the number of elements in ensemble s;

Ns is the ensemble of occurrences of audio signals for class s except for occurrence i; and $\alpha_{er_p}$ is a margin of error.

5. An electronic device for training a machine learning model to conduct authentication transactions comprising:

a processor; and a memory configured to store data, said electronic device being associated with a network and said memory being in communication with said processor and having instructions stored thereon which, when read and executed by said processor, cause said electronic device to:

obtain a training dataset of audio signals, wherein each audio signal includes voice biometric data of a user and an audio data production flag each data class comprises a user identity and the audio data production flag or a different audio production flag;

create a feature matrix for each audio signal according to the class of data to which the respective audio signal belongs;

input the matrices into the machine learning model being trained;

calculate at least one embedding for each of the matrices;

calculate, using the at least one embedding, a loss for a machine learning algorithm (MLA) used for training the machine learning model;

update parameters of the machine learning model being trained based on the calculated loss;

in response to determining criteria defining an end of training have been satisfied, deem the machine learning model to be operable for use in simultaneously successfully verifying the identity of a user based on voice biometric data and verifying the voice biometric data was spoken by a living person; and

20 cause said electronic device to repeatedly:

create the at least one embedding;

create a feature matrix for each audio signal according to the class of data to which the respective audio signal belongs;

input the matrices into the machine learning model being trained;

calculate at least one embedding for each of the matrices;

calculate a loss for the MLA;

and update parameters of the machine learning model being trained based on the calculated loss until the criteria are satisfied.

6. The electronic device according to claim 5, wherein the electronic device is a sole electronic device.

7. The electronic device according to claim 5, wherein the instructions when read and executed by said processor, cause said electronic device to calculate the loss as a metric loss, wherein the metric loss is a triplet loss, a prototypical loss, or a contrastive loss.

8. The electronic device according to claim 5, wherein the instructions when read and executed by said processor, cause said electronic device to calculate the loss according to the equations $$L_s = \frac{1}{n_s(n_s-1)} \sum_{i \in N_s} \sum_{j \in N_s \setminus i} \max(\|f(x_s^i) - f(x_s^j)\|_2^2 - \|f(x_s^i) - f(x_r^k)\|_2^2 + \alpha_{trp}, 0)$$

and $$L_{trp} = \frac{1}{n} \sum_s L_s$$

Where: $L_{tr_p}$ is the triplet loss; Ls is the loss calculated separately for each class s; Matrices xandx belong to the same class, class s, which means the user and the audio data production flag for the matrices are the same; Matrix $x_r^k$ belongs to a different class, class r, at an occurrence k;Functions $f(x), f(x), f(x^{x_k}r)$ are embeddings extracted from the input matrices x,x and $x_r^k$, respectively; N is an ensemble of different classes of data in the training dataset; n is the number of elements in ensemble N; Ns is the ensemble of occurrences of audio signals for class s;ns is the number of elements in ensemble s;Ns\i is the ensemble of occurrences of audio signals for class s except for occurrence i; and arp, is a margin of error.

9. A non-transitory computer-readable recording medium in an electronic device for training a machine learning model to conduct authentication transactions, the non-transitory computer-readable recording medium storing instructions which when executed by a hardware processor cause the non-transitory recording medium to perform steps comprising:

obtaining a training dataset of audio signals, wherein each audio signal includes voice biometric data of a user and an audio data production flag and belongs to a same or different data class, each data class comprises a user identity and the audio data production flag or a different audio data production flag;

creating a feature matrix for each audio signal according to the class of data to which the respective audio signal belongs;

inputting the matrices into the machine learning model being trained:

calculating at least one embedding for each of the matrices;

calculating, using the at least one embedding, a loss for a machine learning algorithm (MLA) used for training the machine learning model; updating parameters of the machine learning model being trained based on the calculated loss; and in response to determining criteria defining an end of training have been satisfied, deeming the machine learning model to be operable for use in simultaneously successfully verifying the identity of a user based on voice biometric data and verifying the voice biometric data was spoken by a living person;

and in response to determining criteria defining an end of training have not been satisfied, repeatedly conducting said creating a feature matrix for each audio signal step, inputting step, calculating at least one embedding for each of the matrices step, calculating, using the at least one embedding, a the loss step, creating, calculating and updating steps until the criteria are satisfied.

10. The non-transitory computer-readable recording medium according to claim 9, wherein the electronic device is a sole electronic device.

11. The non-transitory computer-readable recording medium according to claim 9, wherein the instructions when read and executed by said processor, cause said non-transitory computer-readable recording medium to perform steps compromising calculating the loss as a metric loss, wherein the metric loss is a triplet loss, a contractive loss, or a prototypical loss.

12. The non-transitory computer-readable recording medium according to claim 9, wherein the instructions when read and executed by said processor, cause said non-transitory computer-readable recording medium to repeatedly perform said creating a feature matrix, inputting, calculating at least one embedding, calculating the loss, and updating steps until the criteria are satisfied.

13. The non-transitory computer-readable recording medium according to claim 9, wherein the instructions when read and executed by said processor, cause said non-transitory computer-readable recording medium to perform steps compromising calculating the loss according to the equations $$L_s = \frac{1}{n_s(n_s-1)} \sum_{i \in N_s} \sum_{j \in N_s \backslash i} \max(\|f(x_s^i) - f(x_s^j)\|_2^2 - \|f(x_s^i) - f(x_r^k)\|_2^2 + \alpha_{trp}, 0)$$

-continued
and $$L_{trp} = \frac{1}{n} \sum_s L_s$$

Where: $Lir_p$ is the triplet loss; $Ls$ is the loss calculated separately for each class s; Matrices x and xi belong to the same class, class s, which means the user and the audio data production flag for the matrices are the same; Matrix $x_r^k$ belongs to a different class, class r, at an occurrence k; Functions f(x),f(xL),f(x) are embeddings extracted from the input matrices xf,x-' and $x_r^k$, respectively; N is an ensemble of different classes of data in the training dataset; n is the number of elements in ensemble N; Ns is the ensemble of occurrences of audio signals for class s; ns is the number of elements in ensemble s; Ns\i is the ensemble of occurrences of audio signals for class s except for occurrence i and an is a margin of error.

14. A method of authenticating a user comprising the steps of:
prompting a user to speak a phrase;
capturing, by an electronic device, audio data of the user while the user speaks the phrase;
creating a matrix from the captured audio data according to the class of data to which the captured audio data belongs, wherein each data class comprises a user identity and the audio data production flag or a different audio data production flag;
extracting content from the matrix to create at least one embedding;
creating a verification template from the embeddings;
comparing the verification template against a corresponding enrolment template of the user; calculating a matching score for the comparison; comparing the matching score against a threshold score; and in response to determining the matching score is at least equal to the threshold score, simultaneously successfully verifying the identity of the user based on the captured audio data and verifying the captured audio data was spoken by a living person;
and in response to determining criteria defining an end of training have not been satisfied, repeatedly conducting said creating a matrix for each audio data step, capturing step, extracting content from the matrix to create at least one embedding step, creating, comparing step and updating steps until the criteria are satisfied.

15. The method according to claim 14, said prompting step comprising instructing the user to speak the phrase.

* * * * *